(12) United States Patent
Swiegot et al.

(10) Patent No.: US 9,651,412 B2
(45) Date of Patent: May 16, 2017

(54) BOTTLE DISPENSER HAVING A DIGITAL VOLUME DISPLAY

(75) Inventors: Elmar Swiegot, Wertheim (DE); Alan Shinn, Berkeley, CA (US); Chiko Fan, San Jose, CA (US); David King, Pleasanton, CA (US); Elias Elias, Milton, MA (US)

(73) Assignee: Sage Vision Inc., Milton, MA (US)

( * ) Notice: Subject to any disclaimer, the term of this patent is extended or adjusted under 35 U.S.C. 154(b) by 0 days.

(21) Appl. No.: 13/982,742

(22) PCT Filed: Jan. 31, 2012

(86) PCT No.: PCT/DE2012/000071
§ 371 (c)(1),
(2), (4) Date: Dec. 11, 2013

(87) PCT Pub. No.: WO2012/103870
PCT Pub. Date: Aug. 9, 2012

(65) Prior Publication Data
US 2014/0138404 A1    May 22, 2014

(30) Foreign Application Priority Data

Jan. 31, 2011 (DE) .................. 10 2011 009 869

(51) Int. Cl.
| | | |
|---|---|---|
| *B67D 1/00* | (2006.01) | |
| *G01F 11/02* | (2006.01) | |
| *B01L 3/02* | (2006.01) | |

(52) U.S. Cl.
CPC .......... *G01F 11/023* (2013.01); *B01L 3/0206* (2013.01); *B01L 3/0217* (2013.01);
(Continued)

(58) Field of Classification Search
USPC ...... 222/29, 41, 43, 309, 44, 47, 49, 50, 32; 356/617
See application file for complete search history.

(56) References Cited

U.S. PATENT DOCUMENTS

| | | | | | |
|---|---|---|---|---|---|
| 2,300,110 | A | * | 10/1942 | De Hoog | ......................... 222/43 |
| 2,959,862 | A | * | 11/1960 | Jager | .............................. 33/810 |

(Continued)

FOREIGN PATENT DOCUMENTS

| | | |
|---|---|---|
| CN | 1083209 A | 3/1994 |
| CN | 101909527 A | 12/2010 |

(Continued)

OTHER PUBLICATIONS

Office Action received for Chinese Patent Application No. 20128000671.04, mailed on Jan. 7, 2015, 10 pAGES (2 pages of Partial Translation and 8 pages of Official Copy).

(Continued)

*Primary Examiner* — Kevin P Shaver
*Assistant Examiner* — Michael J Melaragno
(74) *Attorney, Agent, or Firm* — Morrison & Foerster LLP

(57) ABSTRACT

The invention relates to a dosing device for dispensing and/or receiving a dosed amount of a liquid, comprising a piston device being disposed in a housing and a device for determining the stroke of the piston and/or the position of the piston, wherein the device for determining the stroke of the piston and/or the position of the piston features at least one scalar element and at least one measuring device, wherein the scalar element is fixedly disposed at the housing of the piston device and the measuring device is directly or indirectly connected to the piston and can be moved together with the piston, or wherein the scalar element is disposed at the piston so as to be movable with the piston and the measuring device is fixedly disposed at the housing, and wherein the scalar element is designed as an absolutely coded scale.

13 Claims, 4 Drawing Sheets

(52) U.S. Cl.
CPC .......... *G01F 11/021* (2013.01); *G01F 11/025* (2013.01); *B01L 2300/028* (2013.01)

(56) References Cited

U.S. PATENT DOCUMENTS

| | | | |
|---|---|---|---|
| 3,126,638 A * | 3/1964 | Wickert et al. ................ 33/811 |
| 3,143,252 A * | 8/1964 | Shapiro ........................ 222/309 |
| 3,211,335 A * | 10/1965 | Shapiro .......................... 222/50 |
| 3,248,950 A * | 5/1966 | Pursell et al. .............. 73/864.18 |
| 3,285,123 A * | 11/1966 | Weyrauch et al. ........... 356/617 |
| 3,327,900 A * | 6/1967 | Goda ............................ 222/43 |
| 3,337,095 A * | 8/1967 | Marbach et al. ............. 222/309 |
| 3,452,901 A * | 7/1969 | Roach ........................... 222/49 |
| 3,653,556 A * | 4/1972 | Moran et al. ................. 222/309 |
| 3,766,355 A | 10/1973 | Kottkamp |
| 3,805,998 A * | 4/1974 | Croslin ......................... 222/32 |
| 3,807,517 A | 4/1974 | Freeman |
| 3,831,602 A * | 8/1974 | Broadwin .................... 604/210 |
| 3,863,807 A * | 2/1975 | Shapiro et al. ................ 222/43 |
| 3,940,027 A * | 2/1976 | Marterer ...................... 222/309 |
| 3,987,934 A * | 10/1976 | Reed et al. .................... 222/43 |
| 4,003,499 A * | 1/1977 | Shapiro et al. ................ 222/50 |
| 4,004,969 A * | 1/1977 | Beauchemin ................ 162/352 |
| 4,047,585 A | 9/1977 | Dlugos |
| 4,072,247 A * | 2/1978 | Yamazaki ...................... 222/47 |
| 4,074,831 A | 2/1978 | Roach |
| 4,210,261 A * | 7/1980 | Trujillo et al. ................ 222/43 |
| 4,225,035 A * | 9/1980 | Mohney et al. ........... 198/836.3 |
| 4,251,065 A * | 2/1981 | McDougal ..................... 269/25 |
| 4,263,504 A | 4/1981 | Thomas |
| 4,271,440 A | 6/1981 | Jenkins et al. |
| 4,273,257 A * | 6/1981 | Smith et al. ................... 222/43 |
| 4,306,670 A * | 12/1981 | Oshikubo .................... 222/309 |
| 4,347,988 A * | 9/1982 | Warren et al. ............... 241/300 |
| 4,399,856 A * | 8/1983 | Anderson ....................... 160/39 |
| 4,558,691 A | 12/1985 | Okada |
| 4,567,780 A * | 2/1986 | Oppenlander et al. .... 73/864.16 |
| 4,578,052 A | 3/1986 | Engel et al. |
| 4,607,893 A * | 8/1986 | Damico ........................ 384/45 |
| 4,631,519 A | 12/1986 | Johnston |
| 4,695,989 A | 9/1987 | Kimoto |
| 4,729,646 A * | 3/1988 | Clark et al. .................. 359/383 |
| 4,741,736 A | 5/1988 | Brown |
| 4,974,164 A | 11/1990 | Lewis et al. |
| 5,061,073 A * | 10/1991 | Michel .......................... 356/619 |
| 5,128,753 A | 7/1992 | Lemelson |
| 5,220,407 A | 6/1993 | Yamane et al. |
| 5,235,181 A * | 8/1993 | Durana et al. ............ 250/231.18 |
| 5,260,769 A | 11/1993 | Ieki et al. |
| 5,279,044 A * | 1/1994 | Bremer .......................... 33/706 |
| 5,437,290 A | 8/1995 | Bolger et al. |
| 5,466,079 A | 11/1995 | Quintana |
| 5,532,874 A | 7/1996 | Stein |
| 5,563,958 A | 10/1996 | Higgins et al. |
| 5,576,535 A * | 11/1996 | Oosterwijk et al. ...... 250/231.18 |
| 5,624,059 A * | 4/1997 | Lo .................................. 222/309 |
| 5,862,958 A * | 1/1999 | Edwards et al. .............. 222/309 |
| 5,894,678 A * | 4/1999 | Masreliez et al. ............. 33/762 |
| 5,965,879 A * | 10/1999 | Leviton .................... 250/231.13 |
| 6,015,067 A * | 1/2000 | Lang et al. .................. 222/153.13 |
| 6,135,325 A * | 10/2000 | Fessel et al. ................. 222/309 |
| 6,161,731 A | 12/2000 | Sigg |
| 6,175,414 B1 | 1/2001 | Holzapfel et al. |
| 6,552,866 B1 | 4/2003 | Lechner |
| 6,603,115 B1 | 8/2003 | Gordon-Ingram |
| 6,631,990 B2 | 10/2003 | Schippert et al. |
| 6,639,179 B2 | 10/2003 | Vogler et al. |
| 6,664,535 B1 * | 12/2003 | Nahum et al. ........... 250/231.14 |
| 6,674,066 B1 | 1/2004 | Kaneda et al. |
| 6,736,009 B1 | 5/2004 | Schwabe |
| 6,765,195 B1 | 7/2004 | Leviton |
| 6,770,056 B2 * | 8/2004 | Price et al. ................... 604/246 |
| 6,829,400 B2 | 12/2004 | Nakano et al. |
| 6,860,409 B2 * | 3/2005 | Lutz et al. .................... 222/158 |
| 6,873,422 B2 | 3/2005 | Nahum et al. |
| 6,888,635 B2 | 5/2005 | Lacovara |
| 6,923,938 B2 * | 8/2005 | Cote et al. .................... 422/525 |
| 6,977,368 B2 | 12/2005 | Drescher et al. |
| 7,034,283 B2 | 4/2006 | Williams et al. |
| 7,102,123 B2 * | 9/2006 | Chin et al. ................ 250/231.13 |
| 7,112,782 B2 * | 9/2006 | Hofer ........................ 250/231.13 |
| 7,164,120 B2 * | 1/2007 | Strasser .................... 250/231.16 |
| 7,166,852 B2 | 1/2007 | Saracen et al. |
| 7,408,654 B1 * | 8/2008 | Hardin et al. ................ 356/617 |
| 7,418,160 B2 | 8/2008 | Lynggaard |
| 7,520,749 B2 | 4/2009 | Ohlsson |
| 7,663,093 B2 * | 2/2010 | Kusano ..................... 250/231.18 |
| 7,667,186 B2 * | 2/2010 | Kauhanen ................. 250/231.13 |
| 7,690,567 B2 * | 4/2010 | Mauerberger et al. ....... 235/440 |
| 7,976,793 B2 * | 7/2011 | Solotareff et al. ............ 422/501 |
| 8,142,738 B2 * | 3/2012 | Boehm et al. ................ 422/501 |
| 8,537,370 B2 * | 9/2013 | Benner ......................... 356/614 |
| 8,597,593 B2 * | 12/2013 | Boehm et al. ................ 422/501 |
| 8,809,764 B2 * | 8/2014 | Kato .......................... 250/231.1 |
| 2002/0085173 A1 | 7/2002 | Schippert et al. |
| 2002/0121507 A1 | 9/2002 | Vogler et al. |
| 2002/0136483 A1 | 9/2002 | Nakano et al. |
| 2002/0159074 A1 * | 10/2002 | Kawachi et al. ............. 356/616 |
| 2003/0094354 A1 | 5/2003 | Badarneh |
| 2003/0167061 A1 | 9/2003 | Schlegel et al. |
| 2005/0218341 A1 | 10/2005 | Saracen et al. |
| 2005/0259240 A1 | 11/2005 | Goren |
| 2006/0007316 A1 | 1/2006 | Yamanaka |
| 2006/0127864 A1 | 6/2006 | Ohlsson |
| 2007/0069924 A1 | 3/2007 | Goren |
| 2008/0040942 A1 | 2/2008 | Eales et al. |
| 2008/0111063 A1 | 5/2008 | Otsuka et al. |
| 2009/0079996 A1 * | 3/2009 | Mayer et al. ................. 356/617 |
| 2009/0161121 A1 * | 6/2009 | Oberhauser et al. ......... 356/617 |
| 2009/0190142 A1 | 7/2009 | Taylor et al. |
| 2010/0206898 A1 * | 8/2010 | Santo ............................. 222/1 |
| 2011/0127298 A1 * | 6/2011 | Shah ............................ 222/309 |
| 2012/0026321 A1 | 2/2012 | Hasler et al. |

FOREIGN PATENT DOCUMENTS

| | | |
|---|---|---|
| CN | 102095737 A | 6/2011 |
| DE | 3516596 A1 | 10/1986 |
| EP | 0355221 A1 | 2/1990 |
| EP | 0488633 A2 | 6/1992 |
| EP | 0243588 B1 | 12/1992 |
| EP | 0488633 B1 | 6/1995 |
| EP | 0462266 B1 | 8/1995 |
| EP | 0723873 A3 | 6/1997 |
| EP | 1099936 A1 | 5/2001 |
| EP | 0819913 B1 | 10/2001 |
| EP | 1586866 B1 | 10/2008 |
| FR | 2341134 A1 | 9/1977 |
| JP | 9-128759 A | 5/1997 |
| WO | 84/01027 A1 | 3/1984 |
| WO | 86/03866 A1 | 7/1986 |
| WO | 87/01224 A1 | 2/1987 |
| WO | 91/011090 A1 | 7/1991 |
| WO | 93/18584 A1 | 9/1993 |
| WO | 95/09345 A1 | 4/1995 |
| WO | 97/42601 A1 | 11/1997 |
| WO | 99/04368 A1 | 1/1999 |
| WO | 99/46602 A1 | 9/1999 |
| WO | 00/31560 A2 | 6/2000 |
| WO | 01/61637 A1 | 8/2001 |
| WO | 02/053062 A2 | 7/2002 |
| WO | 02/064198 A1 | 8/2002 |
| WO | 03/073738 A2 | 9/2003 |
| WO | 2004/051602 A1 | 6/2004 |
| WO | 2005/099819 A2 | 10/2005 |
| WO | 2006/080851 A2 | 8/2006 |
| WO | 2006/120182 A1 | 11/2006 |

OTHER PUBLICATIONS

Non-Final Office Action received for U.S. Appl. No. 13/918,704, mailed on Dec. 4, 2015, 13 pages.

(56) References Cited

OTHER PUBLICATIONS

Final Office Action received for U.S. Appl. No. 13/918,704, mailed on Aug. 4, 2016, 15 pages.
International Preliminary Report on Patentability received for PCT Patent Application No. PCT/DE2012/000071, mailed on Aug. 15, 2013, 11 pages (5 pages of Official copy and 6 pages of English Translation).
International Search Report and Written Opinion received for PCT Patent Application No. PCT/DE2012/000071, mailed on Jun. 27, 2012, 17 pages (9 pages of Official copy and 8 pages of English Translation.

* cited by examiner

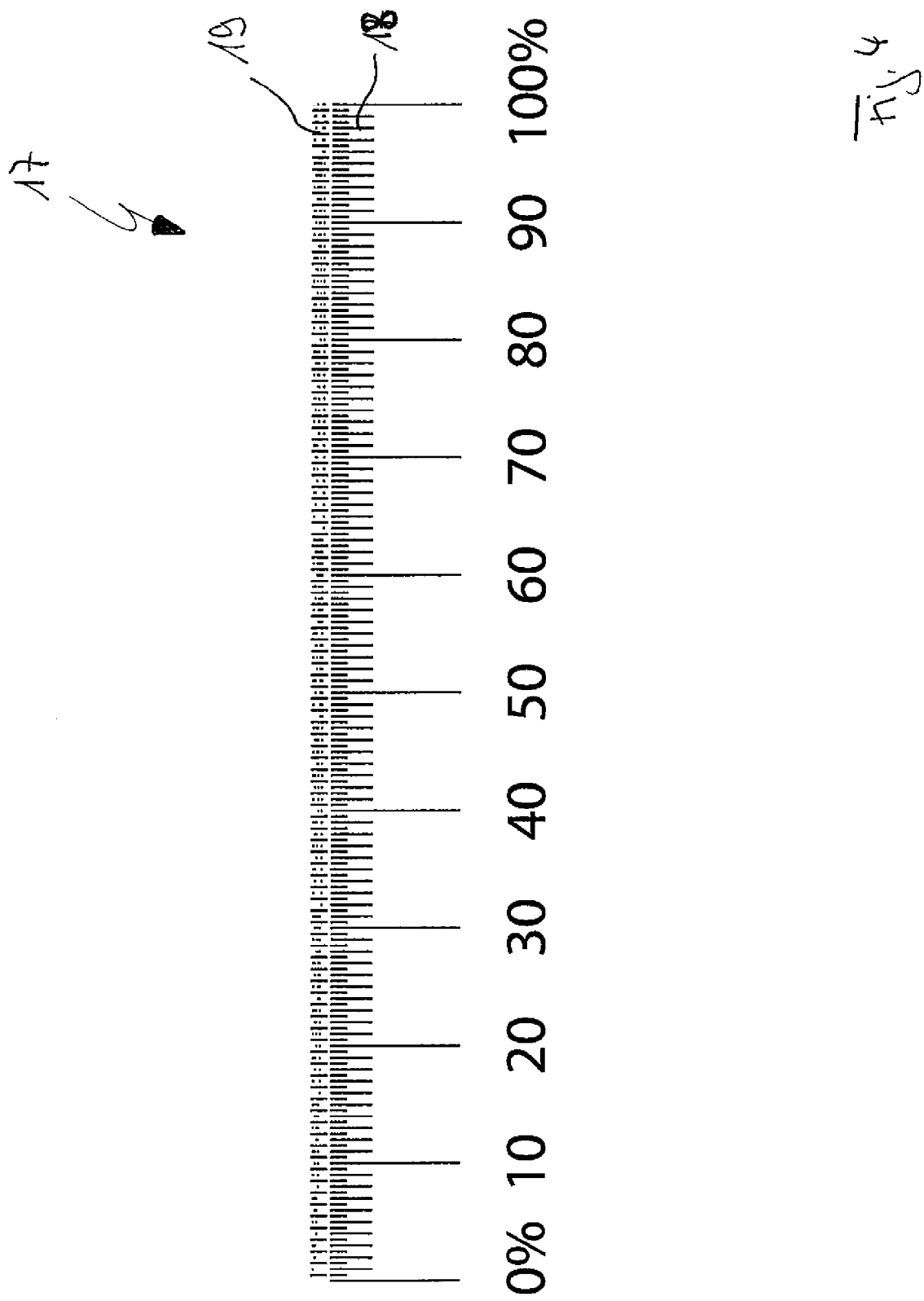

BOTTLE DISPENSER HAVING A DIGITAL VOLUME DISPLAY

CROSS-REFERENCE TO RELATED APPLICATIONS

This is a U.S. National Phase patent application of PCT/DE2012/000071, filed Jan. 31, 2012, which claims priority to German Patent Application No. 10 2011 009 869.0, filed Jan. 31, 2011, each of which is hereby incorporated by reference in the present disclosure in its entirety.

The present invention relates to a dosing device for receiving and/or dispensing a dosed amount of a liquid, comprising a piston device being disposed in a housing and a device for determining the stroke of the piston and/or the position of the piston according to the preamble of claim 1.

Dosing devices of the type cited at the beginning for example serve for dispensing a dosed amount of liquid out of a receptacle, for example chemical substances contained in a bottle. In this context, the dosing device can be designed as a dispenser, pipette, burette, titration device, dilutor or a device for continuously dispensing liquid volumes or the like which are either manually or automatically operable.

Bottle dispensers are known in which an essentially fixedly mounted piston is disposed in a housing and which together with the piston form a piston device. If the housing is moved relative to the piston, liquid is sucked out of the receptacle into the volume formed between the piston and the inner wall of the housing through a valve head and a suction element protruding into the receptacle and is dispensed to the outside through an outlet element in response to a subsequent counter-movement of the housing. The movement of the housing relative to the piston thereby determines the magnitude of the suction volume and hence the dosed amount of the liquid to be dispensed. In this regard, it is known to make provision for a stop at the housing or else outside of the housing, wherein said stop can be fixed at the housing in different positions for the purpose of presetting the volume to be dispensed. In this way, the housing can be moved relative to the piston only to the desired extent which is proportional to the desired amount of liquid. The setting of the stop is carried out with the aid of a scale disposed at the housing or the piston. However, this type of setting is relatively inaccurate and regularly fails to meet the requirements of laboratory chemistry.

Document DE 35 16 596 A1 discloses a dosing device featuring a grading which is provided on the dosing cylinder and which can be sensed by an optical sensor. In this context, it is in fact true that the reading accuracy and thus the setting accuracy of said known dosing device are improved but the type of setting requires a calibration of the display device. This is not only required when the dosing device is put into operation for the first time, but instead every time that for instance the dosing piston is removed from the dosing cylinder for cleaning purposes. This measure is cumbersome and time-consuming.

Starting from this state of the art, it is an object of the present invention to suggest a dosing device which enables an accurate and reliable determination of the liquid to be dispensed, wherein the calibration or setting effort is also considerably reduced.

This object is attained by a dosing device according to the teaching of claim 1.

Advantageous embodiments of the invention are the subject-matter of the dependent claims.

The dosing device for dispensing and/or receiving a dosed amount of a liquid according to the present invention in a known manner firstly features a piston device being disposed in a housing and a device for determining the stroke of the piston and/or the position of the piston. In this context, the piston device for instance can be designed as a linear piston device or a rotary piston device. In this regard, the housing can simultaneously constitute the piston guide, for instance a piston cylinder, or the actual piston guide can be disposed in the housing.

According to the invention, the device for determining the stroke of the piston, for instance in a linear piston unit, and/or the position of the piston, for instance in a rotary piston unit, features at least one scalar element and at least one measuring device. In this regard, the scalar element is either fixedly mounted at the housing of the piston device, and the measuring device is either directly or indirectly connected to the piston and can be moved together with the piston or else the scalar element is disposed at the piston so as to be movable together with the piston, wherein in this case, the measuring device is fixedly mounted at the housing. Here, according to the invention, the scalar element is designed as an absolutely coded scale.

Here, the expression "connected to the piston" is not necessarily intended to refer to a rigid connection. Instead, this expression is also meant for instance to refer to a connection, wherein the measuring device is dragged by the piston only into one direction, while, when the piston or the housing move backwards, the connection with the measuring device may be released.

Firstly, the afore-described inventive design means that the relative position of the measuring device relative to the scalar element is proportional to the position of the piston in the housing and thus serves as a measure for the liquid volume to be received and/or to be dispensed. However, while in the known dosing devices the scale of the scalar element is merely an incremental division scale, the scalar element according to the invention constitutes an absolute scale. In other words, while the scales in known dosing devices are merely indicative of the relative position between the scale and the measuring device, the absolute scale according to the invention enables the determination of the accurate position of the measuring device or the piston, respectively, and thus the determination of an accurately preset volume to be dispensed without the need for a repeated calibration, for instance after removal of the piston from the housing for cleaning purposes, and without the need for repeated assembly. A calibration or adjustment in an inventive dosing device merely needs to be performed prior to the first operation in order to assign a specific volume to at least one first absolute scalar value.

Said scalar element can be designed for instance as a coded magnetic strip which is read by a corresponding magneto-receptive sensor. However, according to a particularly preferred exemplary embodiment of the invention, the scalar element is designed as an optically readable scale, wherein the measuring device features at least one optical sensor. The type of optical sensor is immaterial, provided that the absolute values of the optical scale can be read. Preferably, the optical sensor features at least one camera, in particular a CCD camera. With the aid of such an optical camera system, a relatively large continuous section of the scale can be captured, whereby measuring errors resulting from optical flaws and/or staining of the scale can be precluded or at least can be significantly reduced.

The optical scale can be designed for instance as an essentially wedge-shaped beam, the respective widths thereof corresponding to the piston position and thus the volume. By the same token, the optical scale can be designed as a regular line screen which at regular intervals features for instance alphanumerical markers which can be read and processed by the measuring device. However, according to a particularly preferred exemplary embodiment of the invention, the scale is designed as a binary-coded absolute scale which can be combined with a line screen if required. A scale being coded in this manner can be sensed by a CCD camera in a simple and easy manner and can be correspondingly evaluated.

The scale can be formed, applied, imprinted, adhesively joined in basically any optional manner or can be produced in any other manner on/to an even surface or else also on/to an arbitrarily curved surface, for instance on the outer surface of the cylinder of the housing, a piston cylinder or the piston. The scale can be designed as a linear scale in the case of a piston arrangement and the scale can be designed as an arc-shaped, in particular circular-arc shaped, scale in the case of a rotary piston arrangement.

According to another exemplary embodiment of the invention, the measuring device for the purpose of evaluation features a microprocessor-controlled evaluation unit and a display unit. In said microprocessor-controlled evaluation unit, which can be formed for instance by a programmable microcontroller, the determined position marker of the binary scale can be analyzed and can be assigned to a specific volume (parameterization) for instance by image comparison and in consideration of specific parameters, such as piston or cylinder diameter, zero value, scaling factor and piston stroke. The accordingly determined volume can then be displayed on the display unit in the form of a numerical value or, if necessary, can be transferred to an external evaluation unit, in particular also in a wireless fashion, for instance for documentation purposes in case of an automated dosing device.

In order to enable sufficient readability of the scale by the measuring device also in the case of poor light conditions, the measuring device can feature at least one lighting element, in particular in the form of an LED, for illuminating at least some sections of the optically readable scale.

According to a particularly preferred exemplary embodiment of the invention, the dosing device is designed as a bottle dispenser. In this regard, the dosing device features a piston device being disposed in the housing, and a valve head which can be placed onto a receptacle containing the liquid to be dispensed, and a suction channel and an outlet channel for the liquid retrieved from the receptacle. In this regard, the piston is disposed at the valve head in such a manner that the liquid is directly or indirectly sucked out of the receptacle through the suction channel into the volume being directly or indirectly formed between the piston and the housing wall for instance by means of a glass piston cylinder when the housing is raised relative to the piston, and the liquid contained in the volume is dispensed through the outlet channel when the housing is lowered relative to the piston.

In this context, a guide track can be disposed on the outer wall of the housing, along which the measuring device is directly or indirectly displaceably guided in the direction of the piston, wherein the scalar element can be disposed on or alongside the guide track. Basically, the guide track can be of almost any optional design, for instance can be curved as a part of the cylindrical outer wall of the housing or can be disposed in parallel thereto or can be designed as a preferably even surface which is disposed at the housing so as to be substantially tangential to the outer surface of the cylinder of the housing. The guide track can be milled into the housing, can be integrally formed with the housing, can be molded to the housing or can be formed as a separate assembly part.

In the case of the indirect guidance of the measuring device along the guide track, the measuring device itself is formed in a sled-like manner and can be displaced along the guide track in both directions. However, according to another exemplary embodiment of the invention, provision is made for a guide sled being displaceably guided along the guide track and having the measuring device disposed thereon, wherein the guide sled is connected to the piston so as to follow the movement of the piston. In this embodiment, the measuring device is designed so as to be essentially independent of the piston arrangement, so that the measuring device can be easily exchanged subsequent to damage, and furthermore a measuring device can be employed in different dosing devices.

The guidance of the measuring device or the guide sled, respectively, along the guide track can be performed for instance via a guide groove extending in the center of the guide track, in which at least one shape-complementary and/or function-complementary finger engages at the measuring device or else at the guide sled. However, the guide track on both sides thereof preferably features guide grooves which extend essentially over the entire length of the guide track and in which corresponding shape-complementary and/or function-complementary guide elements of the measuring device and/or the guide sled can be brought into engagement. This measure enables a reliable guidance, wherein jamming can be reliably precluded or the risk of jamming can at least be considerably minimized.

According to a particularly preferable exemplary embodiment of the invention, the measuring device is detachably disposed at the guide track or else at the guide sled. This can be realized for instance by screwing or else in the manner of a clip-in connection. In this way, it is possible in a particularly simple manner to remove the measuring device from the piston-housing arrangement for instance for cleaning purposes, such that it can be easily cleaned or sterilized in an autoclave without causing damage to the measuring device. When a guide sled is used, said guide sled may remain at the housing such that the assembly work is limited to a minimum.

In particular if the liquid volume to be dispensed is to be preset, a fixing device can be disposed at the measuring device or else at the guide sled, by means of which the measuring device can be fixed in a defined position at the housing. In order to set the volume, the housing is firstly moved relative to the piston, i.e. it is removed from the piston, whereby the dosed amount of the volume is enlarged between the inner wall of the housing and the piston, whereby a follower pin disposed at the housing drags along the measuring device, respectively the guide sled bearing the measuring device. If the measuring device indicates the desired volume, the measuring device is fixed at the housing by means of the fixing device and serves as a stop for the piston when the piston is reciprocated in a reversing manner for the purpose of sucking in and dispensing the liquid.

According to another preferred exemplary embodiment, a preferably adjustable stop element for the measuring device or the guide sled can also be provided at the housing, by means of which the zero point of the measuring device can be set only once in the production or calibration process, respectively, of the dosing device. In this way, it can be ensured that the "zero" position marker of the scale actually corresponds to the "zero" volume.

Hereinafter, the invention will be described in greater detail with reference to the drawings showing merely one exemplary embodiment.

In the drawings:

FIG. 4 shows the scale of the exemplary embodiment according to FIGS. 1 to 3 in an enlarged view.

Figure 1:
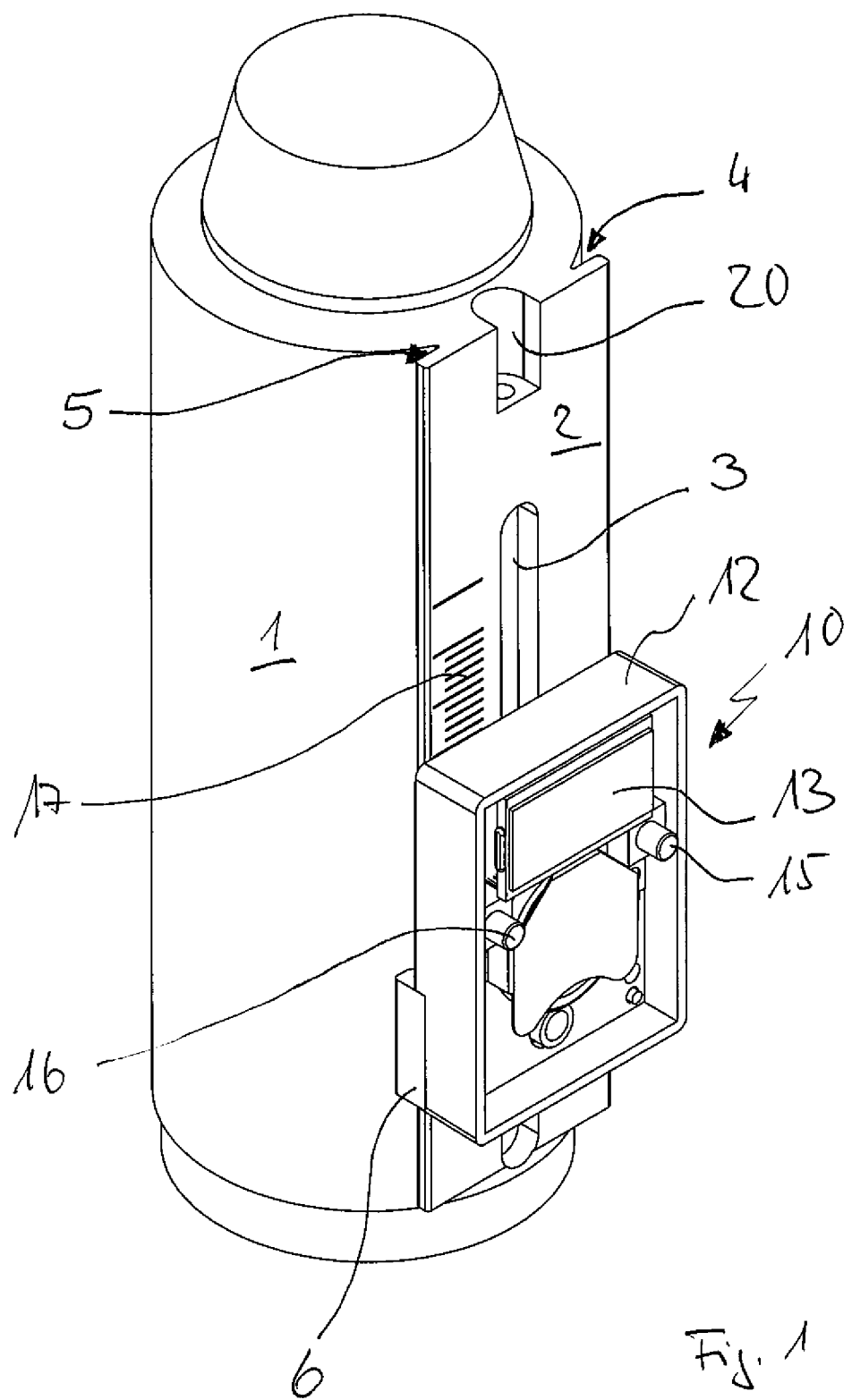
FIG. 1 shows an exemplary embodiment of an inventive dosing device in a perspective schematic view.

The exemplary embodiment shown in the figures relates to a bottle dispenser for dispensing liquids out of a receptacle (not shown). Said bottle dispenser features a conventional valve head (not shown in the figures) comprising a suction pipe, which is dipped into the liquid surface of the receptacle, and an outlet element in the form of an outlet pipe through which the liquid retrieved from the receptacle and dosed in the inventive device is dispensed. In this respect, the design completely corresponds to that of the dispensers known from the state of the art.

The illustrated bottle dispenser further features a housing 1 which is of an essentially cylindrical design and which receives a piston 21. In this way, the housing 1 either forms the piston cylinder, or else the piston cylinder, which for instance is made of a corrosion-resistant, wear-resistant and easily cleanable material, in particular glass, is disposed in the housing. The piston 21 with the first end thereof is disposed in an essentially rigid manner at the valve head. The housing 1 can be moved relative to the valve head and thus is also movable relative to the piston 21 in an axial direction of the piston 21. For the purpose of sucking in the liquid, the housing 1 is pulled away from the valve head, whereby the volume formed between the piston 21 and the inner wall of the housing or the inner wall of the piston cylinder, respectively, is filled with the liquid. If the desired position of the piston 21 is reached in the housing and thus the desired amount of liquid is contained in the cylinder, the housing is moved towards the valve head, whereby the volume is reduced and the liquid is dispensed out of the housing or the piston cylinder, respectively, though the outlet pipe. This design and this function equally completely correspond to those of the known bottle dispensers.

The housing 1 is composed of a plastic material and on its outer wall features an integrally formed guide track 2. Said guide track 2 in the illustrated exemplary embodiment is of an essentially even design and has a groove 3 extending in the axial direction of the piston 21 and which completely penetrates the guide track 2 and the wall of the housing 1 and thus opens toward the inside of the housing 1 and hence toward the piston 21.

The guide track 2 on both sides thereof features two slot-like guide grooves 4 and 5. Moreover, an essentially U-shaped guide sled 6 is provided on the guide track, which on both legs 7 and 8 thereof features hook-like latching elements 9 engaging into the two guide grooves 4 and 5 or engaging behind edge regions of the guide track. The base of the U-shaped guide sled 6 is brought into abutment on the guide sled, such that the guide sled is displaceably disposed on the guide track while being guided by the latching elements 9 and resting on the surface of the guide track.

The base of the U-shaped guide sled features a cone-like follower pin protruding through the groove 3 into the interior of the housing 1 and there entering the region of a stop being disposed at the piston 21. Said stop is formed such that the stop comes into abutment at the piston 21 on the follower pin of the guide sled, when the housing 1 is moved away from the valve head and the stop thus moves the guide sled relative to the housing 1 and the guide track 2. If the housing 1 is moved towards the valve head for dispensing the liquid, the stop at the piston 21 is moved out of the abutment at the follower pin of the guide sled, such that the latter remains in the position which corresponds to the lowest piston position and thus corresponds to the dispensed dosed volume. The guide sled further features a fixing device 23 by means of which the guide sled can be fixed, for instance clamped, in any arbitrary position at the guide track 2.

Furthermore, a measuring device 10 is detachably disposed, for instance screwed or clipped in, at the guide sled 6. In this way, the measuring device 10 can be removed in a simple manner for instance for the purpose of cleaning or sterilization of the piston-cylinder arrangement or the piston-housing arrangement, respectively. The guide sled 6 thereby remains at the housing 1, respectively at the guide track 2.

The measuring device features a box-shaped housing or a box-shaped frame 12, respectively, in which the actual measuring device is disposed. Said measuring device features a merely schematically illustrated CCD camera arrangement 11, a display element and a microprocessor system, wherein in the present exemplary embodiment, the display element being designed in the form of an LCD display and the microprocessor system are combined to form a microcontroller 13. Moreover, the measuring device 10 has a current supply in the form of a battery device 14 and two actuating elements 15 and 16 by means of which the measuring device on the one hand can be activated and on the other hand can be deactivated (reset).

In the region of the camera arrangement 11 the rear wall of the housing 12 and the guide sled 6 feature a recess by means of which the camera is enabled to capture the assigned surface of the guide track 2.

In the region of the guide track 2, which is captured by the camera arrangement, a scalar element, respectively a scale 17, is disposed on the guide track 2. In this context, said scale can be directly imprinted or embossed on the guide track. However, in the exemplary embodiment illustrated here, the scale 17 is imprinted on a foil element which is adhesively joined to the guide track 2.

Figure 2:
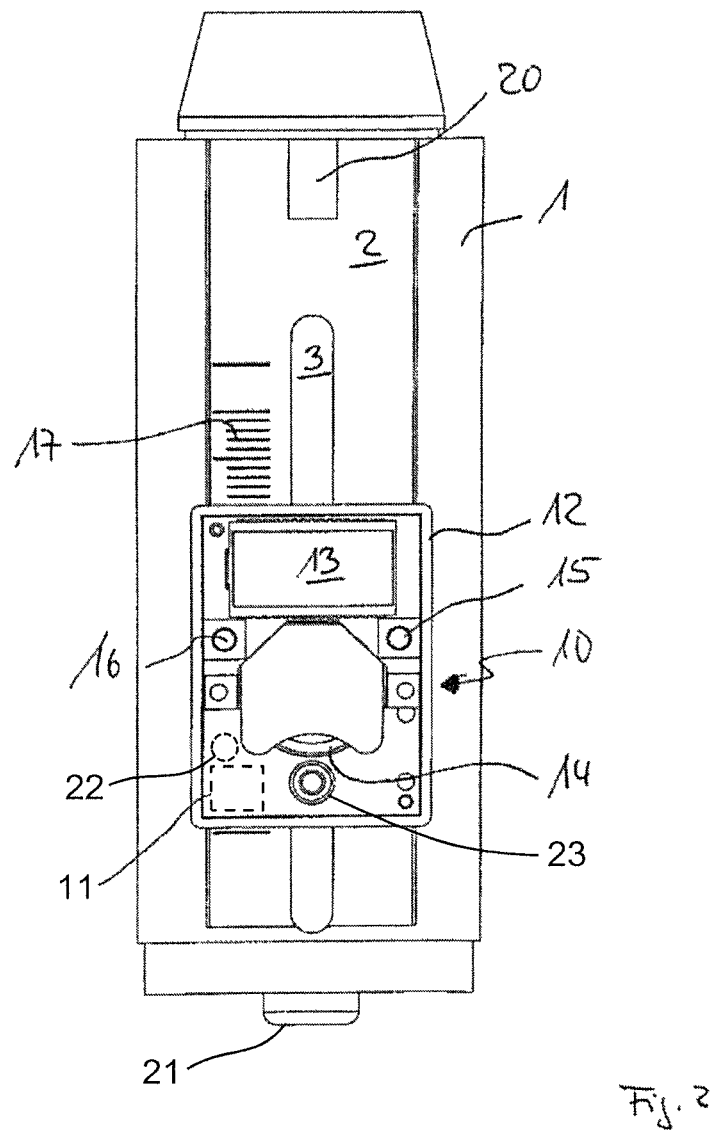
FIG. 2 shows the exemplary embodiment according to FIG. 1 in a frontal view.
Figure 3:
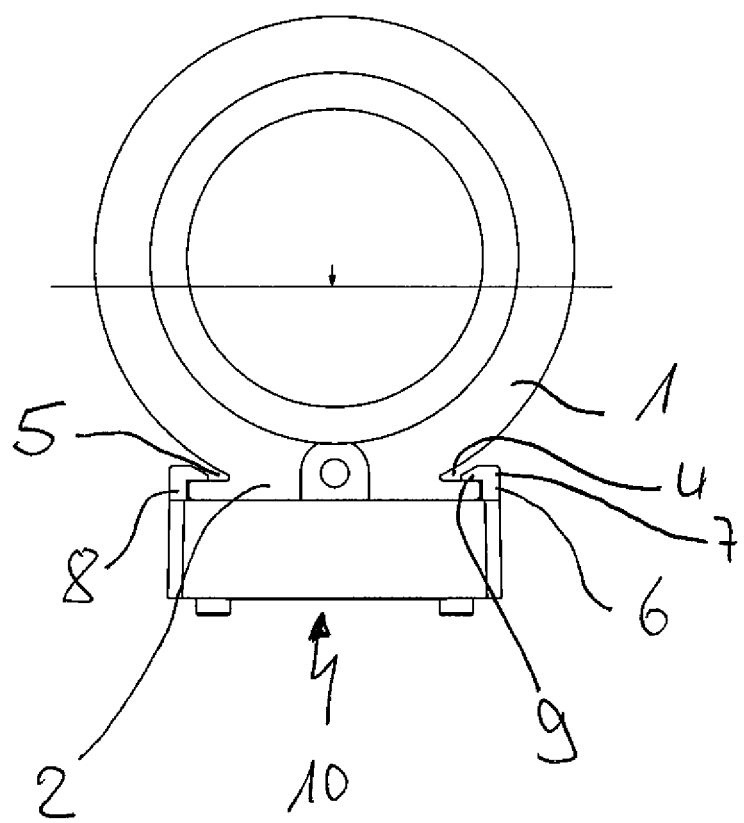
FIG. 3 shows the exemplary embodiment according to FIGS. 1 and 2 in a top view.

In the embodiment illustrated in FIGS. 1 and 2, in order to enable sufficient readability of the scale 17 by the measuring device 10 in the case of poor light conditions, the measuring device 10 includes a lighting element 22, such as an LED, for illuminating at least some sections of the scale 17.

As is shown in particular in FIG. 4, the scale 17 features a divisionally scaled region 18 and a binary-coded region 19. In this way, the divisionally scaled region can be employed for incrementally measuring the movement of the guide sled and thus of the measuring device. By contrast, the binary-coded region 19 assigns an unambiguous value to any optional position on the scale and in interaction with the evaluation unit provides the camera arrangement with unambiguous and absolute positional information of the guide sled 6, the measuring device 10 and the piston 21, such that by means of the parameters piston and cylinder diameter and position an accurate indication of the volume for each position of the piston 21 can be determined.

In order to enable calibration of the dosing device, an adjustable stop element 20 for the measuring device 10 can be inserted into the slot-like groove in order to actually set the zero point of the scale to a zero volume of the piston-cylinder arrangement.

The invention claimed is:

1. A dosing device for receiving and/or dispensing a dosed amount of a liquid, the dosing device comprising:
   a piston device which is disposed in a housing; and
   a device for determining the stroke of the piston and/or the position of the piston along an axis of motion representing a direction of relative motion between the piston and the housing,
   wherein the device for determining the stroke of the piston and/or the position of the piston includes at least one scalar element and at least one measuring device, wherein the at least one measuring device includes at least one sensor configured to read the scalar element,
   wherein either:
      the scalar element is fixedly disposed at the housing of the piston device and the measuring device is directly or indirectly connected to the piston and can be moved together with the piston, or
      the scalar element is disposed at the piston so as to be movable together with the piston and the measuring device is fixedly disposed at the housing,
   wherein the scalar element is designed as an absolutely coded scale, and
   wherein the scalar element comprises a series of coded regions positioned along an axis of the scalar element parallel to the axis of motion, each coded region of the series of coded regions having information encoded along a direction perpendicular to the axis of motion, wherein each coded region represents a value designating an absolute position along the axis of the scalar element.

2. A dosing device according to claim 1, wherein the scale is designed as an optically readable scale and the at least one sensor includes an optical sensor.

3. A dosing device according to claim 2, wherein the optical sensor features at least one camera, in particular a CCD camera.

4. A dosing device according to claim 1, wherein the scale is designed as a binary-coded absolute scale.

5. A dosing device according to claim 1, wherein the measuring device features a microprocessor-controlled evaluation unit and a display unit.

6. A dosing device according to claim 2, wherein the measuring device features at least one lighting element, in particular in the form of an LED, for illuminating at least some sections of the optically readable scale.

7. A dosing device according to claim 1, wherein
   the dosing device is designed as a bottle dispenser configured to be placed onto a receptacle containing the liquid to be dispensed, wherein the dosing device is further configured such that the liquid is sucked out of the receptacle when the housing is raised relative to the piston, and the liquid is dispensed when the housing is lowered relative to the piston.

8. A dosing device according to claim 7, wherein a guide track is disposed at the outer wall of the housing and the measuring device is directly or indirectly displaceably guided along the guide track in the direction of the piston, wherein the scalar element is disposed on or alongside the guide track.

9. A dosing device according to claim 8, further comprising a guide sled being displaceably guided along the guide track and having the measuring device disposed thereon, wherein the guide sled is connected to the piston so as to follow the movement of the piston.

10. A dosing device according to claim 9,
    wherein the guide track features guide grooves being disposed on both sides thereof and extending essentially over the entire length of the guide track, and in which corresponding shape-complementary and/or function-complementary guide elements of the measuring device and/or the guide sled can be brought into engagement.

11. A dosing device according to claim 9, wherein the measuring device is detachably disposed at the guide track or else at the guide sled.

12. A dosing device according to claim 9, wherein a fixing device is disposed at the measuring device or else at the guide sled, by means of which the measuring device can be fixed in a defined position at the housing.

13. A dosing device according to claim 9, further comprising an adjustable stop element for the measuring device or else for the guide sled disposed at the housing.

* * * * *